Patented Oct. 6, 1942

2,297,724

UNITED STATES PATENT OFFICE 2,297,724

TREATMENT OF STYRENE TYPE COMPOUNDS

Frank J. Soday, Upper Darby, Pa., assignor to The United Gas Improvement Company, a corporation of Pennsylvania No Drawing. Application June 3, 1939,
Serial No. 277,166

8 Claims. (Cl. 260—91)

This invention relates to the preservation of the quality of monomeric light oil styrene fractions, light oil fractions of homologues thereof, and to the production of high quality resins therefrom.

In many of the industrial uses to which resins prepared from styrene and its homologues are put, it is desirable that these resins be entirely free of discoloration, since water-white transparency is the characteristic making these resins especially desirable for many uses.

It has been found to be extremely difficult to produce resins of this type in large scale operations from materials derived from light oil without imparting considerable discoloration to the final product.

In certain instances, discoloration is so serious as to completely destroy the usefulness of the resulting resin for many purposes.

It is an object of this invention to provide a method by which resins of clear water-white transparency may be prepared from light oil fractions containing aromatic olefines having the styrene structure as a nucleus.

More particularly, it is an object of this invention to provide a method by which such fractions may be stored, handled, conveyed, processed, and polymerized without becoming discolored or without becoming otherwise contaminated with materials capable of imparting color to the polymerized product.

Another object of this invention is to provide a method by which molded articles, varnishes and lacquers, insulators and many other industrial products of clear colorless water-white transparency may be produced from such fractions.

A still further object of this invention is to provide a method for constructing process vessels, piping, valves, fittings, storage tanks, shipping tanks and containers, fractionating columns, condensers, agitators, and other equipment used in the production, handling, and processing of such fractions.

Other objects will be apparent to those skilled in the art from the following description and examples.

I have discovered that the use of metallic nickel or nickel alloys in the construction of equipment in which such fractions are to be processed or stored, or otherwise handled or manipulated prior to or during polymerization or both, results in resins which are free from undesired discoloration.

In carrying out my invention, equipment used in the storage and processing such as distillation and/or polymerization of such fractions is either constructed entirely of nickel or of an alloy in which nickel is a principal ingredient, or such equipment is lined with nickel or such nickel alloy.

In other words, the construction is such that surfaces coming into contact with the material in process are of nickel or of a nickel alloy in which nickel is a principal ingredient.

I have found that when such fractions, or solutions or mixtures thereof are permitted to remain in contact with certain metals such as copper, iron, Monel metal, brass, bronze, steel, and admiralty metal, which are the chief engineering materials and are the ones most commonly used in the construction of industrial equipment of the character involved, for an appreciable length of time, either the material itself or its polymerization product or both become undesirably discolored.

Illustrative of the effect of various metals on the color of unpolymerized and polymerized styrene derived from light oil are the following examples.

Example 1

Storage and processing entirely free from resultant discoloration may be effected, of course, in the absence of metals. However, as a practical matter, it is usually necessary to resort to metallic equipment in industrial processes.

For the purposes of affording a control, a monomeric light oil styrene fraction, containing 80.7% styrene by weight, was placed in a glass vessel which had been thoroughly cleaned to remove all possible traces of metal. The container was then sealed with a cork stopper covered with sealing wax and to prevent polymerization of the sample was stored at a temperature of —5° C. The sample was allowed to remain in storage for one month after which no change in color could be detected by the usual color determination methods.

This fraction of monomeric styrene was then placed in a glass bomb in the presence of nitrogen and was heated for eight days at 100° C. followed by heating for two days at 145° C. After distilling off unpolymerized material in a vacuum oven at a pressure of approximately one millimeter, absolute, there was obtained a clear, water-white transparent polystyrene resin having a melting point of 184° C.

The polystyrene resin thus obtained was molded at a temperature of 200° C. and a pressure of 2,000 pounds per square inch for a period of three minutes. The molded article thus produced was colorless and transparent. Its color on the standard Gardner color scale was 1.8.

*Example 2*

Another portion of the same styrene fraction as used in Example 1, was placed in a glass container along with several strips of freshly cleaned copper. This container was sealed with a cork stopper and sealing wax, and to prevent polymerization of the sample was stored at −5° C. for one month. During this time the color of the styrene fraction rapidly darkened, acquiring a distinct yellow-orange tint after only four days. At the end of the storage period, the fraction was dark orange in color and considerable insoluble material was present.

After decantation, this discolored monomeric styrene fraction was placed in a glass bomb and heated for eight days at approximately 100° C. in an atmosphere of nitrogen, followed by heating for two days at 145° C. Unpolymerized material was then removed by distillation in a vacuum oven at a temperature of 100° C. and a pressure of one millimeter of mercury absolute.

The polystyrene resin thus obtained possessed a definite orange color. From this resin there was produced a molded article by applying a pressure of 2,000 pounds per square inch for a period of three minutes at a temperature of 200° C. This molded object had a color of 5.1 on the standard Gardner color scale.

*Example 3*

Another sample of the same monomeric styrene fraction as used in the previous examples was similarly stored in a sealed glass container for a period of one month at a temperature of −5° C. in the presence of freshly cleaned strips of iron.

This fraction became slightly discolored during storage.

It was then polymerized in a glass bomb in an atmosphere of nitrogen by heating for eight days at 100° C. followed by heating for two days at 145° C. Unpolymerized material was removed in a manner similar to that described in Example 2.

The resultant resin was molded at 200° C. and a pressure of 2,000 pounds per square inch for three minutes. The color of the resulting specimen was found to be 2.9 on the standard Gardner color scale.

*Example 4*

Another sample of the same monomeric styrene fraction as used in the previous example was similarly stored in a sealed glass container for a period of one month at a temperature of −5° C. in the presence of freshly cleaned strips of Monel metal.

This sample become considerably discolored during storage.

It was then polymerized in a glass bomb in an atmosphere of nitrogen by heating for eight days at 100° C. followed by heating for two days at 145° C. Unpolymerized material was removed in a manner similar to that described in Example 2.

The resultant resin was molded at 200° C. and a pressure of 2,000 pounds per square inch for three minutes. The color of the resulting specimen was found to be 4.9 on the standard Gardner color scale.

*Example 5*

Another sample of the same monomeric styrene fraction as used in the previous example was similarly stored in a sealed glass container for a period of one month at a temperature of −5° C in the presence of freshly cleaned strips of brass.

This sample became considerably discolored during storage.

It was then polymerized in a glass bomb in an atmosphere of nitrogen by heating for eight days at 100° C. followed by heating for two days at 145° C. Unpolymerized material was removed in a manner similar to that described in Example 2.

The resultant resin was molded at 200° C. and a pressure of 2,000 pounds per square inch for three minutes. The color of the resulting specimen was found to be 5.1 on the standard Gardner color scale.

*Example 6*

This example illustrates the inert nature of metallic nickel when employed for my purpose.

A sample of the above styrene fraction was stored for a period of one month at a temperature of −5° C. in a sealed glass vessel containing several strips of freshly cleaned metallic nickel. At the end of this storage period the color and appearance of the styrene solution was found to be unchanged.

This styrene fraction was then heated in a glass bomb in an atmosphere of nitrogen for eight days at 100° C., followed by heating for two days at 145° C. Unpolymerized material was removed in a vacuum oven. A colorless polystyrene resin was obtained, having a melting point of 187° C.

This resin was molded at a temperature of 200° C. and a pressure of 2,000 pounds per square inch for a period of three minutes. The color of the molded object was 1.7 on the standard Gardner color scale. It was clear, colorless and transparent and in every respect comparable in quality to the molded object produced in Example 1.

Much longer storage periods may be used if desired, as shown by the following examples.

*Example 7*

A monomeric light oil styrene fraction, containing 80.7% styrene by weight, was placed in a glass vessel which had been thoroughly cleaned to remove all possible traces of metal. The container was then sealed and stored at a temperature of −5° C. for a period of six months.

This fraction of monomeric styrene was then placed in a glass bomb in the presence of nitrogen and heated for eight days at 100° C., followed by heating for two days at 145° C. After distilling off unpolymerized material in a vacuum oven at a pressure of approximately one millimeter of mercury, absolute, there was obtained a clear, water-white polystyrene resin having a melting point of 180° C.

The polystyrene resin thus obtained was molded at a temperature of 200° C. and a pressure of 2,000 pounds per square inch for a period of three minutes. The molded article thus produced was water-white and transparent. Its color on the standard Gardner color scale was 3.2.

*Example 8*

Another portion of the same styrene fraction was then stored for a period of six months in the presence of metallic nickel at −5° C. The color of the fraction was unchanged.

This fraction was then placed in a glass bomb in the presence of nitrogen and heated for eight days at 100° C., followed by heating for two days at 145° C. After distilling off unpolymerized material in a vacuum oven at a pressure of approximately one millimeter of mercury, absolute, there was obtained a clear, water-white transparent styrene resin having a melting point of 190° C.

The polystyrene resin thus obtained was molded at a temperature of 200° C. and a pressure of 2,000 pounds per square inch for a period of three minutes. The molded article thus produced was water-white and transparent. Its color on the standard Gardner color scale was 2.2.

The results of the above examples illustrate the effects of storage of styrene fractions in contact with glass and various metals. Iron, copper, brass, and Monel metal, the materials most commonly used industrially for storage and processing equipment, yielded discolored products, while metallic nickel yielded no discoloration whatsoever.

While glass is satisfactory, yet because of its brittleness and friability definite limitations are necessarily placed upon its use industrially. Such limitations do not apply to nickel or to alloys in which nickel is a principal ingredient.

Accordingly, clear water-white transparent polystyrene type resins may be prepared from fractions derived from light oil when process vessels, piping, valves, fittings, storage tanks, shipping tanks and containers, fractionating columns, condensers, agitators and other equipment for the processing, handling, conveying, storage and transportation of such fractions are constructed of metallic nickel or its alloys, or are lined with metallic nickel or its alloys.

Examples of metals which are preferably alloyed with nickel are aluminum, cadmium, magnesium, lead, zinc, tin, chromium, tellurium, and the noble metals.

Examples of such alloys are nickel-chromium (80–20), and nickel-chromium-cobalt (32–40 Ni, 20–40 Cr, 24–30 Co).

In general, alloys of nickel in which nickel is one of the principal constituents might be used since the presence of nickel will improve even those metals which are otherwise undesirable, except possibly in the case of copper.

The composition of the alloys given above is by way of illustration only, since the composition of each alloy can be modified over fairly wide limits without departing from the spirit of the invention.

Preferably, however, such alloys are free from substantial quantities of metals which in themselves have a characteristic discoloring action. This applies particularly to copper.

As pointed out above, metallic nickel or the nickel alloys herein described may be employed not only for the construction of equipment, but also as liners for equipment which has been constructed from some other material, such as iron, steel, copper or brass.

Metallic nickel and nickel alloy liners may be applied in any desired manner.

For example, equipment coated by the spraying process has been found satisfactory.

Other methods of coating include electroplating, dipping, flowing molten metal through the parts or system, etc.

It, of course, will be understood that when heat is employed during any processing or other handling, such as in distillation or polymerization, consideration is given to the melting point of nickel and the various nickel alloys.

In the preparation of synthetic resins by polymerization one major difficulty encountered is the removal of the polymerized product from the polymerization vessel or from a mold in which the resin has been cast.

For example, polystyrene obtained by the polymerization of substantially pure monomeric styrene, frequently adheres to the walls of the polymerizing vessel or mold so firmly that it can be removed only with great difficulty.

To overcome this difficulty the polymerization may be effected in apparatus constructed to permit its removal from the polymerized product by stripping from the product, by fracturing of the apparatus, or by extrusion of the product from the apparatus. The use of relatively low melting nickel alloys for the production of molds which are to be subsequently stripped from the finished resin is preferred.

As an example, unpolymerized or partially polymerized material may be cast into molds constructed to permit stripping or fracturing, or into molds from which the cast objects may be extruded. The polymerization is then effected or completed in such molds, for instance, by the application of heat.

For example, polystyrene which has been prepared in a rod shaped mold can be removed by placing the mold in a suitable holder and extruding the polystyrene core by the introduction of a rod or cylinder which is slightly smaller in diameter than the diameter of the mold. It has been found that a riveting hammer is especially well adapted for this purpose.

The separation of the finished product from the metal may be facilitated by the addition of suitable lubricants or plasticizing agents to the polymerization mixture at any desired stage of the reaction. Examples of such lubricants are glycerine, neutral soaps, and talc moistened with traces of paraffin, tallow, or mineral oil.

Homologues of styrene contained in the light oil fractions with which my invention is particularly concerned include (a) nuclear alkylated or arylated styrene, such as orthomethyl styrene, metamethyl styrene, and paramethyl styrene, (b) substituted styrenes in which the substituent group, either alkyl or aryl, or alkyl-aryl in character, is located on the side chain of the styrene molecule, such as alpha methyl styrene and beta methyl styrene, (c) and substituted styrenes in which the substituent groups, either alkyl or aryl, or alkyl-aryl are located both in the nucleus and on the side chain of the styrene molecule such as paramethyl beta-ethyl-styrene.

Such compounds as well as styrene itself may for convenience be defined generically as aromatic olefines containing the styrene structure as a nucleus.

While it is, of course, preferred to apply the invention to all surfaces within which any such light oil fraction is held from its production to its polymerization, or other utilization, it is, of course, to be understood that the invention may be applied in part to this sequence with corresponding advantages. For instance, the invention may be applied in whole or in part to production equipment, or to conveying or other handling equipment, or to storage equipment, or to polymerizing equipment. In other words, improved results over the use of metals such as iron and copper may be obtained by holding such fraction for at least a part by surfaces of nickel or of an alloy in which nickel is a principal ingredient.

For example, if the styrene fraction is distilled just prior to polymerization, bodies responsible for discoloration are largely removed from the unpolymerized material, particularly if the condenser and product receiver are constructed in accordance with this invention. Consequently, if desired, the application of the invention may be limited to such equipment or to the polymerizing equipment, or both, or otherwise.

Furthermore, a portion of the surface by which the light oil fraction of the character described is held may be of some other material of similar insert characteristics such, for instance, as glass, ceramic material, quartz, the noble metals, lead (as in my copending application, Serial No. 256,860, filed February 17, 1939), aluminum (as in my copending application, Serial No. 265,939, filed April 4, 1939), zinc (as in my copending application, Serial No. 265,940, filed April 4, 1939), tin (as in my copending application, Serial No. 277,168, filed June 3, 1939), and magnesium (Dow metal) (as in my copending application, Serial No. 265,941, filed April 4, 1939).

The invention is of especial importance in polymerization by casting, wherein highly desirable results have been obtained. The term casting as more particularly used is applied to completing the polymerization of a previously partially polymerized fraction of the character described in vessels or molds having the shape of the final product.

In the claims the following terms have the following meanings:

The term "nickel," unless otherwise modified, is intended to embrace pure and commercial nickel and substantially copper free alloys in which nickel is the principle ingredient. Such alloys are of large number and can be found in any standard handbook on the subject.

The term "metallic nickel" is intended to embrace pure and commercial nickel.

It is to be understood that the above particular description is by way of illustration, and that changes, omissions, additions, substitutions, and/or modifications might be made within the scope of the claims without departing from the spirit of the invention which is intended to be limited only as required by prior art.

I claim:

1. A process for polymerizing a light oil fraction having as a principal constituent an aromatic olefine containing the styrene structure as a nucleus which comprises polymerizing said fraction by means of heat in a container having its surfaces in contact with said fraction of nickel and free from substantial amounts of copper and iron.

2. A process for polymerizing a light oil styrene fraction which comprises polymerizing said fraction by means of heat in a container having its surfaces in contact with said fraction of nickel and free from substantial amounts of copper and iron.

3. A process for polymerizing a light oil methyl styrene fraction which comprises polymerizing said fractions by means of heat in a container having its surfaces in contact with said fraction of nickel and free from substantial amounts of copper and iron.

4. A process for polymerizing a light oil fraction having as a principal constituent an aromatic olefine containing the styrene structure as a nucleus which comprises placing said fraction prior to complete polymerization into a form having its surfaces in contact with said fraction of nickel and free from substantial amounts of copper and iron and having the shape of the desired final product, and polymerizing said fraction in said form by means of heat.

5. A process for polymerizing a light oil styrene fraction which comprises placing said fraction prior to complete polymerization into a form having its surfaces on contact with said fraction of nickel and free from substantial amounts of copper and iron and having the shape of the desired final product, and polymerizing said fraction in said form by means of heat.

6. A process for polymerizing a light oil methyl styrene fraction which comprises placing said fraction prior to complete polymerization into a form having its surfaces in contact with said fraction of nickel and free from substantial amounts of copper and iron and having the shape of the desired final product, and polymerizing said fraction in said from by means of heat.

7. In the heat processing of a light oil fraction having as a principal constituent an aromatic olefine containing the styrene structure as a nucleus, the step of confining said fraction during said processing within walls having their surfaces in contact with said fraction of nickel, said surfaces in contact with said fraction being substantially completely free from iron and copper.

8. In the heat processing of a light oil fraction having as a principal constituent an aromatic olefine containing the styrene structure as a nucleus, the step of confining said fraction during said processing within walls having their surfaces in contact with said fraction of metallic nickel, said surfaces in contact with said fraction being substantially completely free from iron and copper.

FRANK J. SODAY.